United States Patent [19]

Simpson et al.

[11] Patent Number: 5,192,899
[45] Date of Patent: Mar. 9, 1993

[54] ELECTROMAGNETICALLY POWERED ROTARY MOTOR APPARATUS AND METHOD

[76] Inventors: Alvin B. Simpson, 437 W. Scott, Clovis, Calif. 93612; Charley W. Bisel, 286 E. 12th Ave., Broomfield, Colo. 80501

[21] Appl. No.: 740,091

[22] Filed: Aug. 5, 1991

Related U.S. Application Data

[63] Continuation-in-part of Ser. No. 524,189, May 17, 1990, Pat. No. 5,036,930.

[51] Int. Cl.⁵ .................. H02K 37/12; B60L 15/20
[52] U.S. Cl. .................. 318/139; 180/65.8; 310/254; 310/261
[58] Field of Search ............ 318/138, 139, 254, 439, 318/696, 701; 180/65.1, 65.8, 65.5; 310/68 R, 156, 254, 261

[56] References Cited

U.S. PATENT DOCUMENTS

| | | | |
|---|---|---|---|
| 4,132,911 | 1/1979 | Garron | 310/46 |
| 4,309,620 | 1/1982 | Bock | 290/4 R |
| 4,395,664 | 7/1983 | Terbush | 318/112 |
| 4,500,819 | 2/1985 | Trusock et al. | 318/106 |
| 4,547,713 | 10/1985 | Langley et al. | 318/254 |
| 4,642,539 | 2/1987 | Hinds | 318/439 |
| 4,661,737 | 4/1987 | Barri | 310/166 |
| 4,720,662 | 1/1988 | Lanser | 318/138 |
| 4,883,977 | 11/1989 | Regan | 307/401 |
| 4,949,023 | 8/1990 | Shlien | 318/541 |
| 5,045,742 | 9/1991 | Armstrong et al. | 310/254 |

Primary Examiner—Bentsu Ro
Attorney, Agent, or Firm—Victor Flores

[57] ABSTRACT

A motor system apparatus and method that converts pulsed electromagnetic energy into mechanical force and motion. The motor apparatus produces usable mechanical power by rotary action made possible by a wheel fixedly coupled to an axle whose ends are supported on bearings and which axle provides rotary power output. The wheel is rotationally driven by repeated repelling magnetic forces effected by circumferentially disposed permanent magnets of the same polarity on the wheel which magnetically respond to electronically pulsed electromagnets of the same polarity. The electromagnets are energized to produce a magnetic field that initiates a repelling rotational power stroke of the wheel that is maintained in a rotational state by controlled ON/OFF pulsing of the electromagnet such that the permanent magnets are repeatedly repelled to produce the rotary output power motion.

9 Claims, 3 Drawing Sheets (ENLARGED VIEW
ROTATED 90°)

ELECTROMAGNETICALLY POWERED ROTARY MOTOR APPARATUS AND METHOD

RELATED APPLICATIONS

This application is a continuation-in-part of U.S. patent application Ser. No. 07/524,189, filed on May 17, 1990, now U.S. Pat. No. 5,036,930.

FIELD OF THE INVENTION

This invention relates to motor apparatus and methods for producing work at an output thereof. More particularly, the present invention relates to electrically powered motor apparatus and method of producing work at an output thereof. Even more particularly, the present invention relates to electromagnetically powered rotary motor apparatus that produce work at an output thereof by means of combining electromagnet devices to drive a rotatable mechanical arrangement of elements to produce work useful in propulsion of vehicles and other power input dependent apparatus.

DESCRIPTION OF THE PRIOR ART

The principles of work are considered well known to the artisan as they relate to rectilinear and rotary motion of an object, suffice it to say that it concerns the transference of energy produced by the motion of an object by application of a force and is measured by the product of the force and displacement of the object. The internal combustion engine is a known apparatus employed to perform work by cranking a crankshaft. The advantage to mankind in having the internal combustion engine, is without question, superior to other tools developed by man to manage the daily tasks of living, including the electric motor whose rotor equates to the crankshaft in performing work. The internal combustion engine has had much research attention and has been perfected to yield great satisfaction in work efficiency, torque and speed, but, while the advantages are recognized by all, the polluting disadvantages to the environment have been largely ignored to the detriment of society. Electric motors have replaced many machine application formerly relying on the internal combustion engines, and while they have also enjoyed much technological advances, they have not been perfected to the point of replacing the greatest source of pollution, namely the automobile engine, (see Wall Street Journal Article entitled: "GM Says It Plans an Electric Car, but Details Are Spotty", page B1, dated Thursday Apr. 19, 1990).

The internal combustion engine requires timely firing of a spark within a cylinder chamber having gone through a compression stroke to produce the power stroke that moves a piston/rod in a reciprocating manner to drive a crankshaft having a power output attachment. The end-use apparatus of the power output attachment are many, and include the automobile which has required many engine variations and cylinder block configurations to harness the energy produced at the crankshaft that results into propulsion of the automobile. The electric motors traditionally require large battery units to continually produce rotating drivetrain power, and as alluded to in the Wall Street article, have yet to be commercially attractive as an alternative to the combustion engine technology.

Therefore, a need is seen to exist for a motor apparatus that maintains the attributes of an internal combustion engine, including high performance parameters such as horsepower ratings, speed and torque packaged in a small volume and that further includes the non-polluting attributes of an electric motor without the need for large storage battery units.

SUMMARY OF THE INVENTION

Accordingly, the primary object of the present invention is to provide a motor apparatus having high performance parameters, such as horsepower ratings, speed and torque without the disadvantages of an internal combustion engine, primarily pollution associated with the use of petroleum products.

Another object of the present invention is to provide a motor that operates clean similar to the electric motor but that is more efficient in the conversion of electrical energy to mechanical energy.

A related object of the present invention is to provide a vehicular apparatus that utilizes a motor having the foregoing objects.

Yet another object of the present invention is to provide a method of cranking a crankshaft/axle using a motor having the foregoing objects.

The present invention provides the foregoing objects by providing a motor apparatus that utilizes electrical energy to activate an arrangement of electromagnets that controllably produces magnetic fields to generate repeated rotary power strokes on a pair of rotatable wheels having a circumferential arrangement of permanent magnets that coact with the respective electromagnets to maintain rotary motion on the wheels and a coupled shaft. The electromagnet arrangement is pulsed ON to produce a repelling power stroke on each of the permanent magnets and pulsed OFF to allow free wheeling alignment of all rotating permanent magnet members towards corresponding window regions where the permanent magnets are again subjected to the repelling magnetic field during an ON state of each electromagnet. The underlying principles of the electromagnet rotary motor of the present invention allows motor configurations from at least one rotary permanent magnet means utilizing only one magnetic polarity field produced by an electromagnet to a plurality of complementary pairs of rotatable permanent magnet means, each pair utilizing both north and south magnetic polarities produced by an arrangement of electromagnetic structure.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating two of the various ways in which the invention may be practiced.

DESCRIPTION OF THE PREFERRED EMBODIMENT

Figure 1:
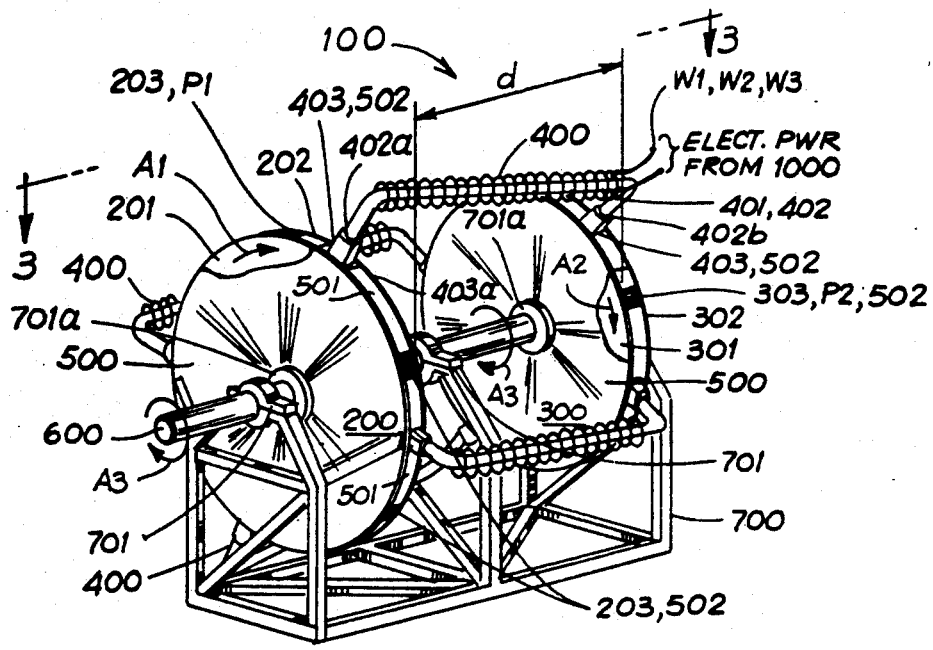
FIG. 1 is a perspective view of the present invention illustrating a rotary motor apparatus which includes a complementary pair of rotatable permanent magnet means about which is disposed an arrangement of electromagnet means for producing rotary power strokes directly on permanent magnet members of the rotatable permanent magnet means, which transfer mechanical energy to a coupled shaft device.
Figure 2:
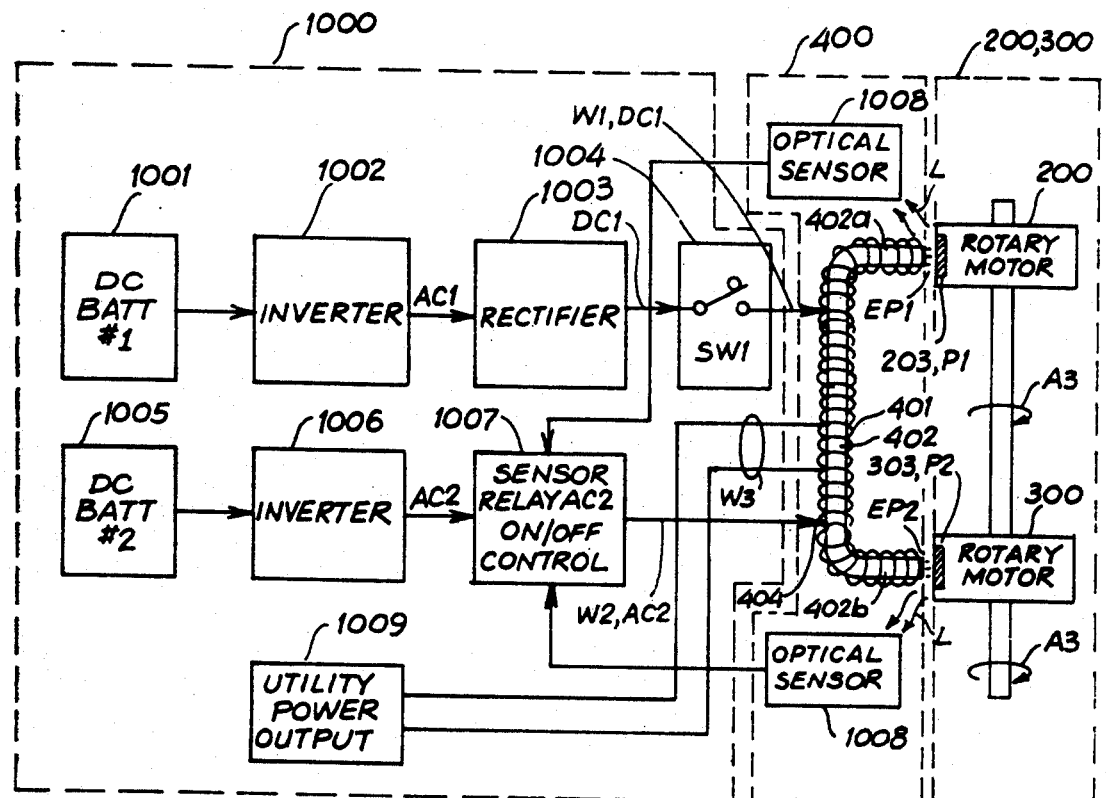
FIG. 2 is an electrical block diagram illustrating the energy source arrangement for producing the ON and OFF magnet states that produce the rotary power drive.
Figure 5:
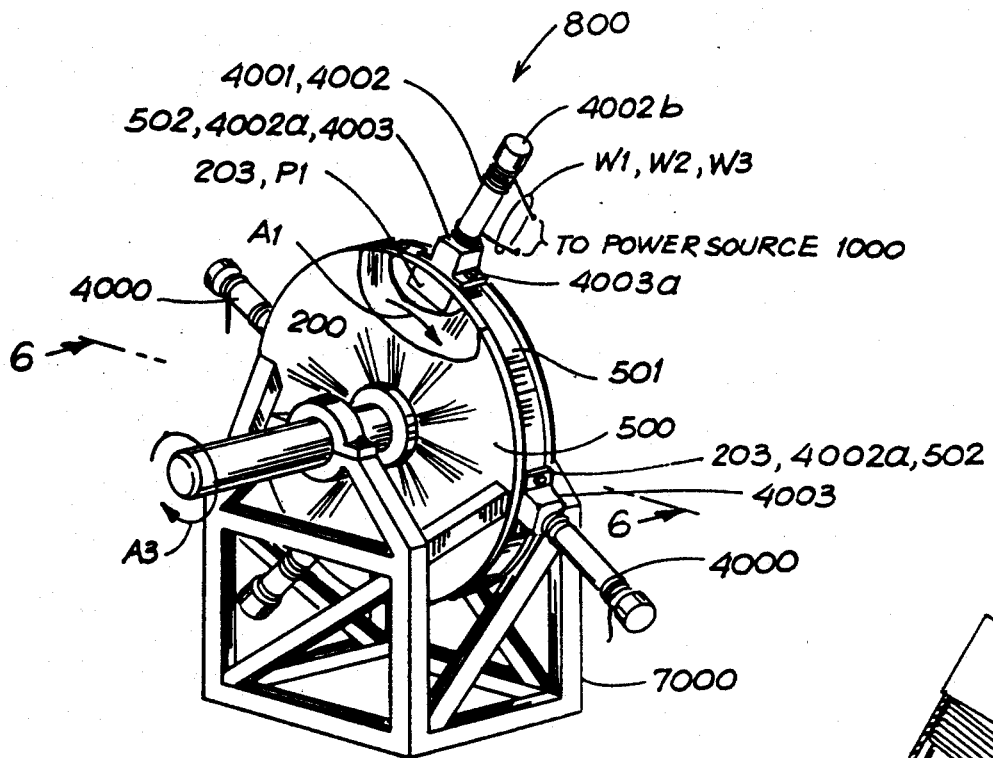
FIG. 5 is a perspective view of the present invention illustrating a rotary motor apparatus which includes a single rotatable permanent magnet means about which is disposed an arrangement of electromagnets which are partially utilized in that only one magnetic polarity is required for producing rotary power at a shaft coupled to the rotatable permanent magnet means.

FIGS. 1 and 5 illustrate rotary motor embodiments 100 and 800, respectively, in accordance with the teachings of the present invention. Both embodiments 100 and 800 rotate for purposes of turning a crankshaft 600 to produce output rotary power drive motions A3. Before detailing the primary elements of the present invention as embodied in FIG. 1 and 5, it is believed best to briefly discuss the magnetic phenomenon involved in operation of the rotary motor apparatus of the present invention. As best understood from the block diagram in FIG. 2, an electrical energy source 1000, comprising dc power sources, such as dc battery sources 1001, 1005, input power to inverters 1002, 1006 respectively, to produce ac voltage AC1, AC2, which are respectively further conditioned and controlled by rectifier 1003 and switched by switch means 1004, 1007 for inputting the respective bias voltages DC1, AC2 to respective windings W1, W2 on coil member 401 via interface 404. DC1 and AC2 electrically combine within structure 400 to produce a null composite magnetic response EP1, EP2 at ends 402a, 402b of core member 402, while DC1 alone produces an active composite magnetic responses EP1, EP2 at end, 402a, 402b of core member 402. The null state of magnetic coupling on core ends 402a, 402b facilitates free wheeling of rotatable permanent magnets 203, 303, while the active state of magnetic coupling repel the rotatable permanent magnets, which are polarized to opposite polarities P1, P2, to produce rotary motion of respective rotatable permanent magnet structures 200, 300, resulting in composite motion A3. The composite magnetic responses EP1 and EP2 are preferred because the circuitry associated with battery 1001 produces a continuous dc bias DC1 on the electromagnets which maintains a fixed magnetic field that is controllably neutralized by input AC2 associated with battery 1005 and does not produce any inductive back emf. In operation, sensor switch 1007 is OFF and switch 1004 is ON such that ends 402a, 402b are magnetized by only the input DC1 which generate active composite magnetic responses EP1, EP2 that are the same as polarities P1, P2 on permanent magnets 203, 303. The OFF/ON state of 1007/1004, respectively, results in a repelling force that rotates the permanent magnets away from the window region 502. Optical sensor 1008 detects the movement of the permanent magnets away from the window region and instantaneously causes sensor switch 1007 to change to an ON state and delivers output AC2 to the coil member 402. The resulting magnetic effect of AC2 is to neutralize the magnetic effect of DC1 such that there is no magnetic coupling at the window region 502, i.e. a null state that facilitates free wheeling action of the rotatable permanent magnet means 200, 300. Repeated OFF/ON and ON/ON states results in continuous rotary drive on shaft 600. The magnetic strength of P1, P2 on permanent magnets 203, 303 determines the repulsion force required of an active composite magnetic response EP1, EP2 to produces the rotary motion A3. As an added feature, utility winding W3 is imposed on core 402 that capitalizes on induction principles to provide a utility power output 1009 during operation of the apparatus 100.

Referring now to FIG. 1 where, by example, a complementary pair of rotatable permanent magnet means 200, 300 are supported on frame structure 700. Rotatable permanent magnet means 200, 300 include a common shaft 600 supported on block bearings 701 with sleeves 701a extending to wheel enclosures 500. Wheel enclosures 500 include a band member 501 upon which window regions 502 are circumferentially disposed for attachment of a plurality of electromagnetic structures 400 that span a distance d from one wheel structure to the other. Within each wheel enclosure 500 are located a pair of wheel plates (201, 202), (301, 302) that are mechanically coupled to shaft 600 and between which are fixedly attached permanent magnets 203, 303 with respective polarities P1, P2. The material used to construct wheel plates (201, 202), (301, 302) is preferably aluminum which is lightweight and factors the magnetic effect of the high strength permanent magnets 203, 303, especially during a free wheeling state of operation. Each permanent magnet means 400 comprises a coil member 401 and a concentric core member 402 having ends 402a, 402b that are mechanically coupled to window regions 502 by means of mechanical coupler 403 and associated mounting hardware 403a. Thus, when windings W1 and W2 on each electromagnet structure 400, (also W3 for utility power only or for possible battery recharge), are electrically coupled to circuit 1000 and each end 402a and 402b is controllably activated, rotary motion A1 combines with rotary motion A2 to produce composite rotary motion A3 on shaft 600.

Figure 3:
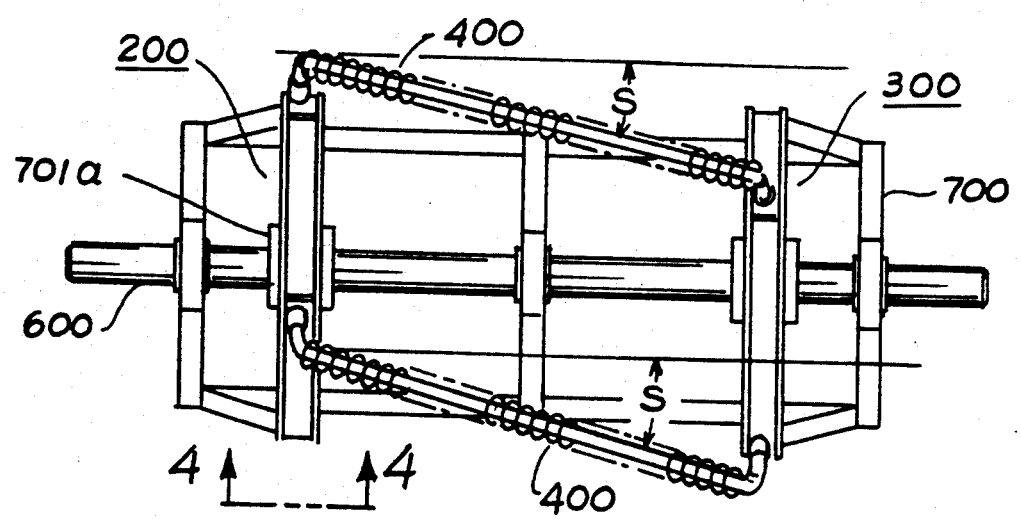
FIG. 3 is a top view taken along line 3—3 in FIG. 1 showing the skewed mechanical relationship of the electromagnets with respect to the drive shaft for circumferentially spacing the composite magnetic window regions and associated rotary power strokes acting on the output drive shaft.

By example, and in reference to FIG. 3, a more uniform composite rotary power stroke can be developed from output shaft 600 if electromagnets 400 are arranged in a skewed relationship S with respect to a projected axis of shaft 600. Assuming that there are four equally spaced permanent magnets 203, 303 on each wheel and four electromagnets 400 are arranged in a 45 degree skewed arrangement with respect to shaft 600, then in one revolution, each permanent magnet receives four power strokes from any one electromagnet for a total of 32 power strokes in one revolution. The 32 power strokes are transferred to shaft 600 in sets of eight (8) strokes, at eight (8) equally distributed points on the composite power circle associated with shaft 600.

Figure 4:
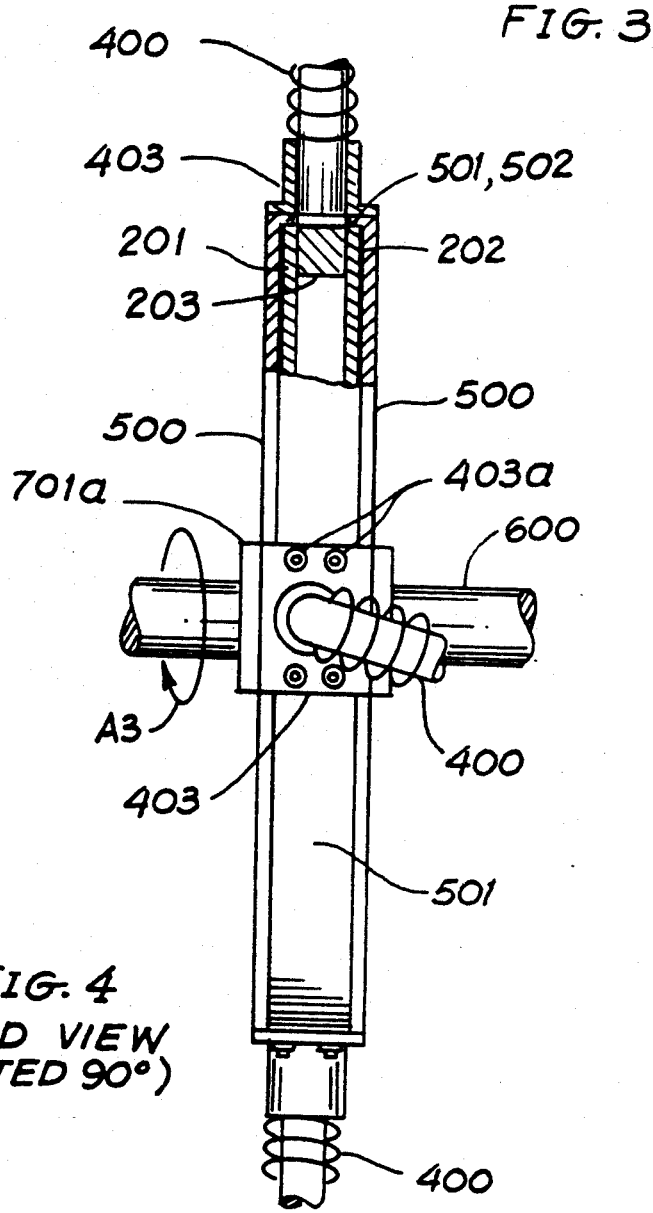
FIG. 4 is an enlarged view of a rotatable permanent magnet means rotated 90 degrees from the view taken along line 4—4 in FIG. 3 illustrating the arrangement of electromagnets including a cutaway view showing a permanent magnet fixedly mounted between two wheel plates that make up one rotatable wheel.

FIG. 4 is an enlarged typical view of a rotatable permanent magnet means 200, 300, where a permanent magnets 203 is shown fixedly mounted between wheel plates 201, 202 and disposed at a window region 502 where electromagnet 400 and magnet 203 are in a magnetically coupled relationship for producing motion A3. Also shown is the mechanical attachment of electromagnet 400 to enclosure/band 500/501 using coupler 403 and hardware 403a.

Figure 6:
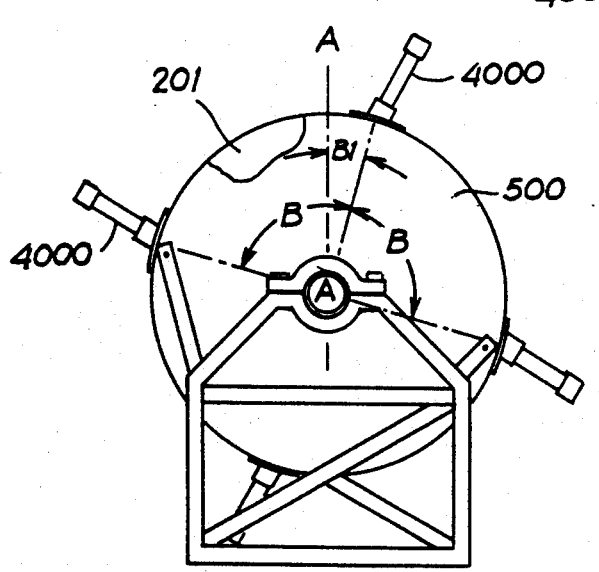
FIG. 6 is a side view taken along line 6—6 in FIG. 5 illustrating the spaced circumferential arrangement of electromagnets about the permanent magnet means and also illustrating the skewed placement of the permanent magnets with respect to the output drive shaft to gain a gravitational advantage during a free wheeling state of operation.
Figure 7:
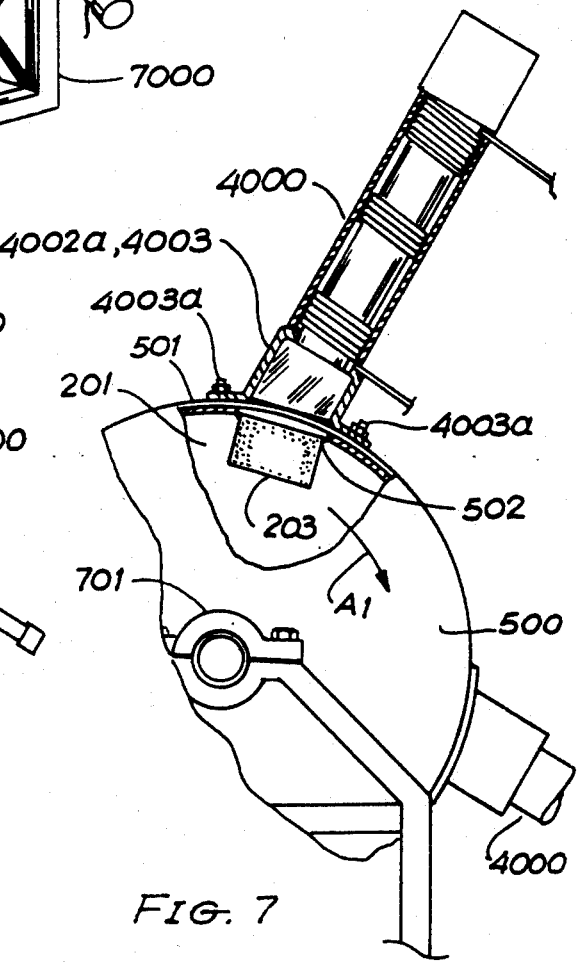
FIG. 7 a partial side view of the apparatus illustrated in FIG. 5 illustrating a cut-away view of a window region's mechanical structure supporting the rotatable permanent magnet means exposing one of the rotatable wheel plates upon which a permanent magnet is fixedly attached.

The rotary motor embodiment 800, shown in FIG. 5, functions in the same manner as the embodiment 100, Shown in FIG. 1, except that only one rotatable wheel structure 200 is supported on frame structure 7000 and electromagnets 4000 are not formed in a U-shape manner as electromagnets 400 in embodiment 100. Rather, each electromagnet 4000 is formed such that core member 4002 is arrangement in a straight line for mechanical attachment of one end 4002a over a window region 502 using coupler 4003 and hardware 4003a. Electromagnet end 4002b is not utilized. The structure for rotatable permanent magnet means 200 is the same a previously described and includes a plurality of circumferentially spaced permanent magnets 203, each having a polarity P1 that electromagnetically coacts with end 4002a upon energization of electromagnet 4000 from a controlled energy source, such as energy source 1000, for producing rotary motion A1 that transfers to output rotary power drive A3. By Example, each coil member 4001 is comprised of windings W1, W2, and W3 for sakes of maintaining electrical interface compatibility. FIG. 6 illustrates a side view of apparatus 800 exemplifying the equally circumferential spacing B and vertical offset B1, with respect to line A—A, of electromagnets 4000. Although of not much significance once rotary motion is established, offset B1 is believed to be of initial value in that the gravitational effect assist the initial rotary power stroke to overcome inertia associated with the wheel structure. FIG. 7 shows a cutaway view of electromagnet 400 and the mechanical attachment thereof onto band 501 and associated enclosure 500 over a window region 502 where magnetic coupling occurs. A coupler 4003 mechanically interfaces between core end 4002a and band 501 over window 502 for timed magnetic coupling with each permanent magnet 203 that rotates within the window region.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

We claim:

1. A rotary motor apparatus, said apparatus comprising:

energy source means for powering said apparatus;
    at least one electromagnet means electrically coupled and responsive to said energy source means for producing controlled magnetic fields; and
    at least one rotatable permanent magnet means having a mechanically coupled shaft for producing rotation of said shaft and converting energy from said energy source means to work, said rotatable permanent magnet means being mechanically disposed proximate said electromagnet means for being magnetically coupled by said controlled magnetic fields for producing said rotation, said electromagnet means comprising a coil member and a fixedly and centrally located magnetic core member with respect to said coil member,
    said energy source means comprises a first energy source circuit for producing a first magnetic field on said core member and a second energy source circuit for producing a second magnetic field on said core member, said first magnetic field and said second magnetic field coacting to produce a composite magnetic field that effects rotationally cranking said shaft,
    said first magnetic field comprising a magnetic field that polarizes an end of said core member at a first polarity that is the same as a permanent polarity on a plurality of permanent magnet members of said at least one rotatable permanent magnet means, and
    said second magnetic field comprises a controlled on/off neutralizing magnetic field that neutralizes said first magnetic field during on-states of said second energy source circuit such that said composite magnetic field has no magnetic effect on said at least one rotatable permanent magnet means and that during an off-state facilitates said composite magnetic field having a rotational driving magnetic effect on said at least one rotatable permanent means such that repeated rotational urging of said at least one rotatable permanent magnet means effects said cranking of said crank shaft.

2. A rotary motor apparatus, as recited in claim 1, wherein:

said coil member comprising a first winding associated with said first magnetic field, a second winding associated with said second magnetic field and a third winding for inductively generating auxillary power during operation of said rotary motor apparatus.

3. A rotary motor apparatus, said apparatus comprising:

energy source means for powering said apparatus;
    at least one electromagnet means electrically coupled and responsive to said energy source means for producing controlled magnetic fields; and
    a rotatable permanent magnet means having a mechanically coupled shaft for producing rotation of said shaft and converting energy from said energy source means to work, said rotatable permanent magnet means being mechanically disposed proximate said electromagnet means for being magnetically coupled by said controlled magnetic fields for producing said rotation, said electromagnet means comprising a coil member and a fixedly and centrally located magnetic core member with respect to said coil member,
    said electromagnet means comprises at least one substantially U-shaped electromagnetic structure, and said rotatable permanent magnet means comprises at least one complementary pair of common shafted, oppositely polarized, rotatable permanent magnet means, each rotatable permanent magnet means of said complementary pair having a plurality of circumferentially spaced permanent magnet members having the same permanent polarity, said at least one substantially U-shaped electromagnetic structure having each of its distal ends mechanically disposed to effect timed simultaneous magnetic coupling with respective ones of said spaced permanent magnet members on each of said rotatable permanent magnet means to produce rotational cranking of said shaft.

4. A rotary motor apparatus as recited in claim 3, wherein:

said energy source means comprises a first energy source circuit for producing a first magnetic field on said core member and a second energy source circuit for producing a second magnetic field on said core member, said first magnetic field and said second magnetic field coacting to produce a composite magnetic field that effects rotationally cranking said shaft.

5. A rotary motor apparatus as recited in claim 4, wherein:

said first magnetic field comprising a magnetic field that polarizes an end of said core member at a first polarity that is the same as a permanent polarity on a plurality of permanent magnet members of said rotatable permanent magnet means, and said second magnetic field comprises a controlled on/off neutralizing magnetic field that neutralizes said first magnetic field during on-states of said second energy source circuit such that said composite magnetic field has no magnetic effect on said rotatable permanent magnet means and that during an off-state facilitates said composite magnetic field having a rotational driving magnetic effect on said rotatable permanent magnet means such that repeated rotational urging of said rotatable permanent magnet means effects said cranking of said shaft.

6. A rotary motor apparatus as recited in claim 3, wherein:

said at least one substantially U-shaped electromagnetic structure comprises four of said electromagnetic structures mechanically disposed to provide four circumferentially spaced magnetic coupling regions about each said rotatable permanent magnet means.

7. A rotary motor apparatus as recited in claim 6, wherein:

each U-shaped electromagnetic structure being controllably energized in response to sensed data received by said energy source means relating to the proximity of said spaced permanent magnet members on each of said rotatable permanent magnet means relative to said regions, each end of said electromagnetic structures producing a timed magnetic field at said regions responsive to being energized that rotationally urge respective pair members of said complementary pair of rotatable permanent magnet means to produce said cranking.

8. A method of producing rotary power drive, said method comprising the steps of:

(a) providing an electromagnetically driven rotary motor comprising: an energy source means for powering said motor;

at least one electromagnet means electrically coupled and responsive to said energy source means for producing controlled magnetic fields; and a rotatable permanent magnet means having a mechanically coupled shaft for producing rotation of said shaft and converting energy from said energy source means to work, said rotatable permanent magnet means being mechanically disposed proximate said electromagnet means for being magnetically coupled by said controlled magnetic fields for producing said rotation, said electromagnet means comprising a coil member and a fixedly and centrally located magnetic core member with respect to said coil member, said electromagnet means comprise at least one substantially U-shaped electromagnetic structure, and said rotatable permanent magnet means comprises at least one complementary pair of common shafted, oppositely polarized, rotatable permanent magnet means, each rotatable permanent magnet means of said complementary pair having a plurality of circumferentially spaced permanent magnet members having the same permanent magnetic polarity, said at least one substantially U-shaped electromagnetic structure having each of its distal ends mechanically disposed to effect timed simultaneous magnetic coupling with respective ones of said spaced permanent magnet members on each of said rotatable permanent magnet means to produce rotational cranking of said shaft;

(b) controllably energizing said energy source means such that timed magnetic coupling occurs at said electromagnet's distal ends;

(c) electromagnetically repelling said spaced permanent magnet members due to the occurrence of said timed magnetic coupling and producing rotation of said shaft; and (d) repeating the occurrence of said timed magnetic coupling to maintain said rotation of said shaft.

9. A vehicular apparatus having a drive train axle and wheels for effecting propulsion, said apparatus comprising:

energy source means for powering said apparatus;

at least one electromagnet means electrically coupled and responsive to said energy source means for producing controlled magnetic fields; and at least one rotatable permanent magnet means having a mechanically coupled shaft for producing rotation of said shaft and converting energy from said energy source means to work, said rotatable permanent magnet means being mechanically disposed proximate said electromagnet means for being magnetically coupled by said controlled magnetic fields for producing said rotation, said electromagnet means comprising a coil member and a fixedly and centrally located magnetic core member with respect to said coil member, said shaft being mechanically coupled to said drive train for transferring said produced rotation to said axle and wheel and propelling said vehicular apparatus, said energy source means comprises a first energy source circuit for producing a first magnetic field on said core member and a second energy source circuit for producing a second magnetic field on said core member, said first magnetic field and said second magnetic field coacting to produce a composite magnetic field that effects rotationally cranking of said shaft, said first magnetic field comprising a magnetic field that polarizes an end of said core member at a first polarity that is the same as a permanent magnetic polarity on a plurality of permanent magnet members of said at least one rotatable permanent magnet means, and said second magnetic field comprises a controlled on/off neutralizing magnetic field that neutralizes said first magnetic field during on-states of said second energy source circuit such that said composite magnetic field has no magnetic effect on said at least one rotatable permanent magnet means, and that during an off-state facilitates said composite magnetic field having a rotational driving magnetic effect on said at least one rotatable permanent magnet means such that repeated rotational urging of said at least one rotatable permanent magnet means effects said cranking of said shaft.

* * * * *